(12) United States Patent
Srinivasan et al.

(10) Patent No.: US 6,610,408 B1
(45) Date of Patent: Aug. 26, 2003

(54) TPO BLENDS CONTAINING MULTIMODAL ELASTOMERS

(75) Inventors: Satchit Srinivasan, Carrollton, TX (US); Edward Szczepaniak, Arlington, TX (US); Jhy-Yuan Her, Grand Prairie, TX (US); Michael K Laughner, Lake Jackson, TX (US); Teresa Plumley Karjala, Lake Jackson, TX (US)

(73) Assignees: Solvay Engineered Polymers, Grand Prairie, TX (US); Dupont Dow Elastomers L.L.C., Wilmington, DE (US); The Dow Chemical Company, MIdland, MI (US)

( * ) Notice: Subject to any disclaimer, the term of this patent is extended or adjusted under 35 U.S.C. 154(b) by 1166 days.

(21) Appl. No.: 08/747,124

(22) Filed: Nov. 8, 1996

(51) Int. Cl.[7] .................. C08L 23/00; C08L 23/04; C08L 23/16
(52) U.S. Cl. ............... 428/423.1; 524/515; 524/528; 525/191; 525/193; 525/240
(58) Field of Search .............. 525/240, 191, 525/193; 524/515, 528

(56) References Cited

U.S. PATENT DOCUMENTS

| | | | |
|---|---|---|---|
| 4,314,912 A | 2/1982 | Lowery, Jr. et al. | 252/429 |
| 5,064,802 A | 11/1991 | Stevens et al. | 502/155 |
| 5,338,589 A * | 8/1994 | Bohm et al. | 428/36.9 |
| 5,532,309 A * | 7/1996 | Fukui et al. | 524/451 |
| 5,599,865 A * | 2/1997 | Koizumi et al. | 524/413 |
| 5,608,008 A * | 3/1997 | Miyata et al. | 525/240 |
| 5,639,829 A * | 6/1997 | Yamaguchi et al. | 525/240 |
| 6,005,053 A * | 12/1999 | Parikh et al. | 525/221 |

FOREIGN PATENT DOCUMENTS

| WO | WO 94/06859 | 3/1994 |
|---|---|---|
| WO | WO 94/17112 | 8/1994 |

* cited by examiner

*Primary Examiner*—Jeffrey Mullis
(74) *Attorney, Agent, or Firm*—Winston & Strawn

(57) ABSTRACT

Thermoplastic polyolefin blends having improved resistance to fluids such as petroleum fuels after being painted with flexible coatings such as polyurethanes paints and the like are disclosed. These blends include a crystalline or semi-crystalline polyolefin such as polyethylene, polypropylene, or a copolymer of ethylene and a $C_3$ to $C_{10}$ olefin, and a multimodal elastomer of sequentially polymerized ethylene-α-olefin monomers. The substantially crystalline polyolefin is present in an amount of 30 to 98 weight percent, while the multimodal elastomer, which is substantially amorphous, is present in an amount of about 2 to 70 weight percent. The blends may contain additional polymeric components, fillers and the like. In addition to increased paint adherence, higher weld-line strength, low temperature ductility and processability can be achieved.

23 Claims, 1 Drawing Sheet

TPO BLENDS CONTAINING MULTIMODAL ELASTOMERS

TECHNICAL FIELD

The present invention relates to thermoplastic polyolefin ("TPO") blends which include a crystalline or semi-crystalline polyolefin and a multimodal elastomer, preferably of a sequentially polymerized ethylene-α-olefin copolymer which has a multimodal distribution of at least one of molecular weight, density or α-olefin comonomers.

BACKGROUND ART

Various TPO blends are molded into lightweight, durable articles which are useful as automobile parts, equipment housings, toys and the like. Often, it is desired to paint such components for aesthetic or functional purposes. When these blends contain combinations of crystalline or semi-crystalline polymers and elastomers, however, the surface of the molded article generally must be treated so that the paint can durably adhere to the article. Paint adhesion is a particular concern in articles molded from TPO blends such as those described in U.S. Pat. Nos. 4,480,065, 4,439,573 and 4,412,016.

One way to obtain good paint adhesion is to treat the surface of the article with an interlayer coating to promote or enhance adhesion. When the article is to be used in environments which include high humidity conditions, or is to be exposed to petroleum fuels or solvents, however, the interlayer coatings can be detrimentally affected with reduced paint adhesion as a result. Thus, the paints will chip or peel away during use of the article. An example of this is the use of a painted molded TPO automobile bumper. Such articles will not be approved for use on automobiles unless the paint retains suitable adhesion properties in the presence of such fluids and moisture.

U.S. Pat. No. 5,498,671 discloses a solution to this problem by utilizing a combination of low and high molecular weight ethylene/propylene/diene monomer (EPDM) rubbers with crystalline or semi-crystalline polyolefins. The resultant TPO blends possess excellent adhesion to paints, with superior resistance to petroleum fluids and moisture. A minor drawback of this system is the use of the low molecular weight EPDM, which is a sticky, viscous liquid at room temperature. Thus, it is necessary to carefully handle this viscous fluid, such as by retaining it in plastic bags, or pumping to efficiently facilitate its introduction into an external mixer which mixes the components together. It would be desirable to retain the good paint adherence of such materials, however, while improving the ease of handling of the components during manufacture of the blend.

SUMMARY OF THE INVENTION

The present invention relates to a thermoplastic polyolefin blend which includes a polyolefin component of a substantially crystalline polymer in an amount of about 30 to 98 percent by weight of the blend; and an elastomer of a sequentially polymerized ethylene α-olefin copolymer having a multimodal distribution of at least one of molecular weight, density or α-olefin monomers, and being present in an amount of about 2 to 70 percent by weight of the blend The polyolefin is preferably present in an amount of about 40 to 96 and most preferably 50 to 95 percent by weight of the blend, and is a crystalline or semi-crystalline polyethylene polymer, polypropylene polymer, or copolymer of ethylene and a $C_3$ to $C_{10}$ α-olefin The multimodal elastomer is substantially amorphous and is preferably present in an amount of about 4 to 60 and more preferably about 5 to 50 percent by weight. Advantageously, a bimodal elastomer is used with the different modes being present in a split of between about 75:25 and 25:75.

In one embodiment, at least two modes are present, having weight average molecular weight modes which differ by at least about 25,000 and preferably by about 50,000, 100,000 or more. Alternatively one mode may have a molecular weight which is a multiple of at least about 1.5 and preferably 5 and 50 times higher than that of the other mode. In an embodiment termed a "high-low" split, one mode has a lower molecular weight of about 30,000 or less and the other mode has a higher molecular weight of at least about 150,000 to provide a non-liquid polymer that can be handled as a solid at room temperature.

In another embodiment, called the "high-high" split, one mode has a molecular weight of at least about 50,000 and the other has a molecular weight of at least about 100,000. In the "high-high" split, it is advantageous for one of the molecular weights to be about 75,000 and the other molecular weight to be at least about 150,000.

In another embodiment of the invention, at least two modes having densities which differ by at least about 0.005 grams per cubic centimeter (g/cc) are used. Preferably, one mode has a density of greater than 0.85 g/cc and the other mode has a density of less than about 0.96 g/cc, with the difference between densities of the modes being less than about 0.1, preferably less than about 0.05 and more preferably less than 0.03 g/cc.

In yet another embodiment of the invention, at least two modes containing comonomers which differ in length by at least one carbon atom are used. Preferably, the comonomers of the modes differ in length by at least two carbon atoms, and one of which is propene, butene, hexene or octene.

The blends of the invention may also include at least one additional polymeric component in an amount of between about 1 and 20 percent by weight of total blend At least two different additional polymeric components may be present, but in a total amount of about 3 and 35 percent by weight of the blend. One suitable polymeric component is a copolymer of ethylene and a $C_3$ to $C_{10}$ (three to ten carbon atom) α-olefin or a terpolymer of that copolymer and a diene monomer. Another suitable polymeric component is a copolymer of ethylene and an α-olefin which is made with a Kaminsky or metallocene catalyst.

If desired, the blend may include a filler in an amount of about 1 to 30 percent by weight of the blend. Preferred fillers such as talc, mica, glass, or calcium carbonate can be used. Other conventional additives such as nucleating agents, oils and the like can be included if desired.

The blends can be formed into molded articles having one or more outer surfaces, with at least one of the outer surfaces including a coating thereon for aesthetic or functional purposes, if desired. Although any coating can be used, a two component polyurethane material coating is preferred.

DETAILED DESCRIPTION OF THE INVENTION

Figure 1:
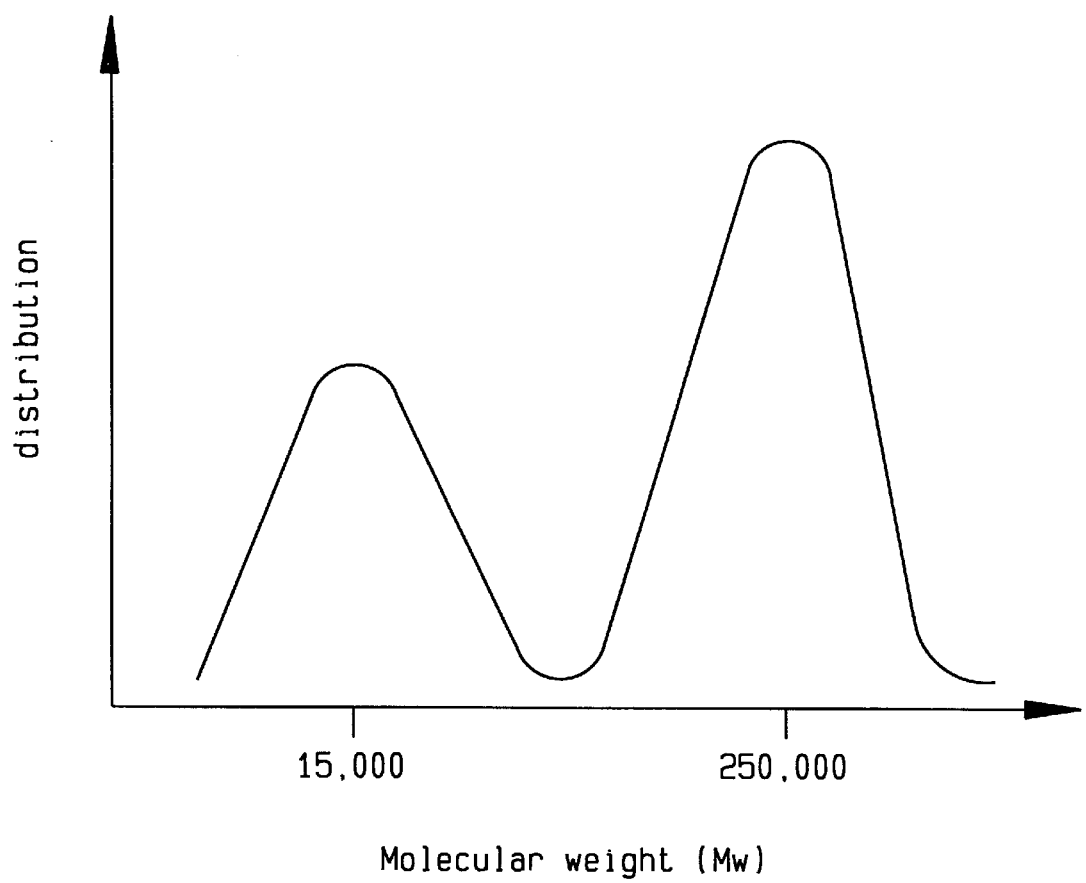
FIG. 1 is a graphical illustration of molecular weight distribution (MWD) of a useful bimodal elastomer which represents one embodiment of the TPO blends of the invention.

The polyolefin component of the TPO blends of this invention is a crystalline or semi-crystalline polyethylene or polypropylene polymer or copolymer, or a copolymer of ethylene and a $C_3$ to $C_{10}$ alpha-olefin. The copolymer may be a random copolymer, a block copolymer or a graft copolymer.

The crystallinity of this component can range from mostly crystalline (above 50%) to fully crystalline (i.e., 100%), i.e., that of a highly crystalline material, or by a degree of crystallinity sufficient to exhibit partially crystalline or semi-crystalline behavior, i.e., 30% to 70% crystallinity. When polypropylene is used as this component, it has about 30 to 98%, and preferably about 50 to 80%, crystallinity as measured by X-ray analysis or solvent extraction. The term "substantially crystalline" is used herein to designate those polymers or copolymers which are crystalline or semi-crystalline.

The polyolefin component may be utilized in an amount of between about 30 and 98 percent by weight of the blend, preferably at between about 40 and 96 percent and most preferably at between about 50 and 95 percent. When mixtures of substantially crystalline polyolefin polymers or copolymers are used, the total amount will be within these ranges although the individual amounts of each can vary as desired.

The elastomer component is a substantially amorphous copolymer of ethylene and at least one α-olefin having between 3 and 10 carbon atoms. "Substantially amorphous" means that the copolymer has less than 20% percent by weight of crystallinity Although any 3 to 18 carbon α-olefin can be used, propene, butene, hexane and particularly octene are preferred. This elastomer component is present in an amount of about 2 to 70, preferably about 4 to 60 and most preferably about 5to 50 percent by weight of the blend. If desired, an addition monomer such as a diene may be added.

This elastomer component has a multimodal distribution of at least one of molecular weight, density or α-olefin monomers. There is no theoretical limit to the number of modes that could be present in this component, although a finite number of 10 modes or less would be used for most applications. For purposes of illustrating preferred embodiments of the invention, a bimodal distribution will be shown. One of ordinary skill in the art would be well aware of how to produce any desired number of modes in the elastomer by varying the relative amounts of proportions of each mode, and the invention should not be limited to bimodal elastomers for that reason.

When a bimodal distribution of different molecular weight elastomers is provided, a MWD of the elastomer would be of the type illustrated in FIG. 1. One experimental product having this distribution is available from Dupont Dow Elastomers, and is known as CO1RO2. As shown in FIG. 1, this product includes one mode which has a weight average molecular weight of about 250,000, and another mode which has a weight average molecular weight of about 15,000.

The multimodal elastomers of the invention are formed in situ by interpolymerization using multiple reactors or reactors systems and a constrained geometry catalyst system, or a single reactor having multiple stages. Two reactors are conveniently used, although multiple reactors (i.e., more than 2) in any kind of series or parallel configuration can be used. Suitable multiple reactor configurations include a loop reactor, spherical reactor, stirred tank reactor, plug-flow tube reactor, or reaction extruder.

If desired, different catalyst systems can be used in each reactor. For example, a first reactor could utilize a constrained geometry catalyst, such as is described in U.S. Pat. No. 5,064,802, while a second reactor can utilize a heterogeneous Ziegler catalyst system, such as is described in U.S. Pat. No. 4,314,912. An exemplary in situ interpolymerization system is disclosed in WO 94/17112. The content of each of these documents is expressly incorporated by reference herein to the extent necessary for one to understand the methods of making these multimodal elastomers. The present invention relates to the use of these multimodal elastomers in a TPO blend rather than to the various methods for manufacture of such elastomers.

Any of a wide range of different properties would be useful for the multimodal elastomeric component of the present TPO blends. In a first embodiment for a multimodal molecular weight elastomer, for example, the lowest molecular weight could be as low as about 3,000 to 7,000 (typically 5,000), but generally would be about 10,000 to 20,000 (typically 15,000) or more. The highest molecular weight can be as high as about 350,000 with existing technology, but generally would be above about 150,000, more particularly, greater than about 160,000 to 180,000. The difference between the lowest and highest molecular weights at a minimum should at least be significant or measurable In many cases, the one molecular weight will be at least about 1.5 times to as high as between 5 and 50 times the molecular weight of other. A weight average molecular weight difference of about 25,000 to 50,000 is generally sufficient to provide the advantages of the present elastomer component for most blends.

In a second embodiment, suitable multimodal elastomers include those having a lowest molecular weight mode of at least 75,000, preferably 85,000 and most preferably 100,000, with a highest molecular weight mode of at least 115,000, preferably 125,000 and most preferably 150,000. Highly advantageous multimodal elastomers have a lowest weight average molecular weight mode of more than 100,000 and a highest weight average molecular weight mode of above 200,000. The overall weight average molecular weight of the elastomer would thus be in the range of about 85,000 and 350,000 and preferably between about 105,000 to 250,000. Molecular weights can be measured using the method described in U.S. Pat. No. 5,272,236, the content of which is expressly incorporated herein by reference thereto.

Another way to prepare multimodal elastomers is by providing relatively high and low density segments in the elastomer. This is done by providing different types or concentrations of α-olefin monomers for sequential reaction with ethylene in the manner explained previously. For example, a low density monomer could be used to provide an overall density of as low as about 0.85 g/cc when polymerized with ethylene, while a high molecular weight component can provide a density of as high as about 0.96 g/cc when polymerized with ethylene. Small deviations between the high and low densities can provide meaningful differences in the resulting bimodal elastomer. If desired, a difference of at least about 0.003 g/cc is acceptable, although values of 0.005 g/cc to as high as 0.1 g/cc can be used. The overall density of the elastomer can vary, but preferably would be less than about 0.95, preferably less than about 0.9 and more preferably less than about 0.87 g/cc.

The relative split of high and low components in the elastomer can vary over wide ranges. When two different modes are used, relative amounts of 5:95 to 95:5 provide measurable differences in high and low density or molecular weight values. When greater than 95 parts of one component is used, the effect of the other component becomes relatively insignificant. In addition, the use of a high amount of one component compared to the other is an inefficient use of the second reactor due to the relatively small amounts of the second component that are to be reacted. Thus, it is typical to use relative amounts of between 75:25 and 25:75 for bimodal elastomers. For certain embodiments, relative amounts of between 2:1 and 1:1 are conveniently formulated and provide advantageous bimodal properties. Thus, a preferred range of about 70:30 and 30:70 is used. When other multimode distributions are desired, the relative amounts of each mode is varied appropriately. For five modes, for example, each component can vary between 10 and 35 parts, provided that the overall ratio totals 100. As a specific example, a ratio of 10:15:20:20:35 is possible, but a wide range of other proportions could be used if desired.

It is also possible to utilize different α-olefin monomers to achieve multimodal properties. When this is done, the α-olefin monomers can differ by one carbon atom and preferably by 2, 3 or more carbon atoms. Particularly advantageous bimodal elastomers can be made with propene and octene, although other combinations may be used.

One way to make such elastomers is to add each monomer in a separate reactor. For a bimodal elastomer, one monomer is added in the first reactor and the second monomer in another reactor. When this is done, the relative splits mentioned above can be used to define the relevant amounts of each monomer. Also, a mixture of the monomers can be added to each reactor, with a greater amount of one monomer provided in the mixture which is directed to the first reactor, and a greater amount of the other monomer provided in the mixture which is directed to the second reactor. Advantageously, about 2:1 to 4:1 of the monomers in the feed to the first reactor and about 1:2 to 1:4 of the monomers in the feed for the second reactor is used. Other ratios can be used when greater numbers of monomers are used.

As noted above, the amount of the multimodal elastomer to be incorporated in the TPO blends of the present invention can vary from about 2 to 70 percent by weight of the blend. When the final blend includes only the polyolefin component and the multimodal elastomer, relative amounts of about 4:6 to 5:1 (i.e., 40:60 to 80:20) would typically be used. The polyolefin is generally present in equal or greater amounts compared to the elastomer. Lesser amounts of the multimodal elastomer, i.e., less than about 35 to 50 percent by weight, would be used where other polymer additives are included in the blend.

The addition of the multimodal elastomer provides blends which exhibit superior performance after molding and painting with typical flexible automotive or other coatings. In particular, increased resistance to gasoline or other petroleum fuels has been observed. Before painting, the molded TPO blend surfaces are pretreated with a conventional powerwash, and a coating of a conventional chlorinated polyolefin adhesion promoter is used for greatest paint adhesion. Paints of all types can be used, including one pack or two component polyurethane coatings, which are then baked at temperatures around 80° C.

When superior coated performance after painting molded TPO blends is required, it is advantageous to include a multimodal elastomer having a high/low molecular weight distribution. Thus, the high weight average molecular weight component would be from at least about 150,000 to about 175,000, while the low weight average molecular weight component would be from less than about 15,000 to 30,000. Preferably, the lower molecular weight mode would have a density of less than 0.88, more preferably less than 0.875 and most preferably less than 0.87 g/cc. This product preferably has a weight average molecular weight/number average molecular weight (Mw/Mn) ratio of greater than 6, more preferably greater than 8 and most preferably greater than 10 with a melt flow index @ 10 Kg and 2 Kg at 190° C. (I10/I2) that is greater than 10. The Mw/Mn ratio should be greater than the difference of (I10/I2)—6.63, more preferably (I10/I2)—5.63 and most preferably (I10/I2)—4.63 for optimum enhanced paintability. Also, the split of high and low molecular weight material would be between 75:25 and 25:75 and preferably about 50:50.

For additional advantages with regard to weld-line strength, low-temperature impact toughness and improved injection molding processability, it is preferable to use a multimodal elastomer having a high/high molecular weight distribution. In this embodiment, one molecular weight is at least about 50,000, while the other is at least about 75,000. Preferably, one molecular weight is at least about 100,000, while the other is at least about 150,000 to 200,000.

The Examples illustrate the most preferred TPO blends of this invention. Also, all molecular weights are presented in weight average molecular weight unless otherwise indicated.

A wide variety of additional polymeric components can be added to the TPO blends of the present invention. One additional polymeric component is a substantially amorphous copolymer of ethylene with a $C_3$–$C_{10}$ α-olefin or a terpolymer of the ethylene-α-olefin and a diene compound. At least two of these additional components can be used, if desired, each having a different molecular weight. Such polymeric components would have a molecular weight distribution Mw/Mn of less than about 5. Also, a substantially amorphous copolymer of ethylene and an α-olefin, preferably propene, butene, hexene or octene, polymerized using Kaminsky or metallocene catalysts and having a relatively narrow molecular weight distribution of less than about 1.8, can be used.

These additional polymeric components can each be added individually in an amount of about 1 to 20 percent by weight. When two or more are added, the total amount of these additional components will generally be between 3 to 35 percent by weight.

When desired, fillers can be added to the present TPO blends. Preferred fillers include inorganic materials such as talc, mica, glass, calcium carbonate or the like. The amount of filler will generally be in the range of about 2 to 30 and preferably about 3 to 15 percent by weight of the blend.

The TPO blends of the invention have excellent paintability, a broad range of stiffness values, as well as high impact and tensile strengths which make them suitable for automotive applications.

Certain blends also exhibit superior weld line strength, low temperature toughness and improved processability during injection molding. The TPO blends of the invention can be molded or otherwise formed or shaped to produce articles that are lightweight, durable, and have surfaces that are paint receptive. The articles can be treated with an adhesion promoter and then painted, and the paint cured at temperatures exceeding 80° C. to produce a durable and attractive finish. Any of the conventional adhesion promoters can be used with good results.

The polymer blends of the invention can be coated with paints, particularly with paints such as commercially available two-component polyurethanes, to provide products with superior fluid and petroleum resistance. The blends of the invention also may be coated with paints which have active functional groups such as acrylics, polyesters, epoxy resins, carbodiimides, urea resins, melamine-formaldehyde resins, enamines, keto-imines, amines, and isocyanates to provide products with improved fluid resistance. These types of paints are well known in the paint and coatings industry.

Various additives can be incorporated into the polymer blends of the invention to vary the physical properties of the blends of the invention while retaining good paint adhesion. These additives may include pigments, dyes, processing aids, anti-static additives, surfactants and stabilizers such as those which generally are used in polymeric compositions. Other conventional additives, such as nucleating agents, oils, lubricants, antioxidants, UV stabilizers, fungicides, bacteriocides and the like, can be included as desired.

Particularly useful additives may include styrene-maleic anhydride copolymers and cationic surfactants for improving moisture resistance, and well known copolymers such as ethylene-acrylic acid copolymers ("EAA") and ethylene-methacrylic acid copolymers ("EMAA"), or mixtures or blends thereof.

The fluid resistance of preforms of the polymer blends of the invention bearing a single coating of 2-part commercially available polyurethane is evaluated by placing the coated preforms into a gasoline bath. The gasoline bath may be mixtures of any of 90% unleaded gasoline and 10% ethanol; 90% unleaded gasoline and 10% methanol; or 100% unleaded gasoline. The preforms employed are 2½" squares, or possibly 1"×31" bars. The coated preform remains immersed in the gasoline bath until failure, that is, paint at the edges of the preform curls away from the preform. The coated preform then is removed from the bath and the time to failure recorded. The fluid resistance of the coated preforms are shown in the examples.

The % peel area of the paint from the preform also is a measure of the ability of the preform to retain paint against the action of petroleum fluids such as gasoline. The painted preform is removed from the gasoline bath after a 30-minute immersion and the area, if any, that is free of paint, is measured. The % peel area is determined by dividing the area of the preform free of paint by the original painted area of the preform. Low % peel area is desired.

EXAMPLES

The invention will now be described by reference to the following non-limiting examples.

The blends of the Examples are formed by mixing the components in the amounts recited. Blending of the components is performed by well known methods and devices such as Banbury mixers and extrusion equipment. The polymer blends can be molded into shaped preforms by known methods such as extrusion, injection molding, blow molding, or thermoforming. The shaped preforms of the polymer blends are coated with a single layer of paint of two-part polyurethanes in accordance with well known methods such as spraying. The polymer blends also can be pelletized for storage and shipment prior to molding into shaped articles.

Generally, processing of the polymer blends of the invention can be performed using Banbury mixers or twin screw extruders. When a Banbury mixer is employed to prepare these blends, a single screw extruder can be used to pelletize that component blend. The resulting pellets then are supplied to an injection molding machine for manufacture of molded articles.

During preparation of these blends with a Banbury mixer, the ram pressure in the Banbury mixer is about 30–35 psi. Mixing is continued until fluxing temperature is achieved, i.e., the temperature at which the viscosity of the blend drops sharply. When fluxing temperature is achieved, mixing is terminated and the resulting batch of material is removed from the Banbury mixer. The batch then is ground into chips and/or pelletized in a single screw extruder.

Pellets of the formed component blends are supplied to an injection molding machine for injection molding into shaped products. Processing conditions are shown below in Table 1.

TABLE 1

| Processing Conditions | |
|---|---|
| BANBURY MIXING | |
| ROTOR SPEED (RPM) | 185 |
| RAM PRESSURE (PSI) | 32 |
| TIME TO FLUX (SEC) | 95 |
| FLUX TEMP (° F.) | 360 |
| BATCH TEMP (° F.) | 410 |
| PELLETIZING SINGLE SCREW EXTRUDER | |
| END ZONES TEMP (° F.) | 360 |
| CENTRAL ZONE TEMP (° F.) | 380 |
| SCREW SPEED (RPM) | 95 |
| MELT TEMP (° F.) | 375 |
| MOLDING TEMPERATURES | |
| END ZONE 1 | 340 |
| CENTRAL ZONE 2 | 360 |
| CENTRAL ZONE 3 | 360 |
| END ZONE 4 | 340 |
| SCREW SPEED (RPM) | 90 |
| MOLD TEMP (° F.) | 80 |
| INJECTION TIME (SEC) | 10 |
| COOLING TIME (SEC) | 25 |
| INJECTION PRESSURE (PSI) | 550 |
| FILLING TIME (PSI) | 10 |
| HOLDING PRESSURE (PSI) | 430 |
| HOLDING TIME (SEC) | 15 |
| BACK PRESSURE (PSI) | 50 |

The bimodal elastomers are made as described above, with information provided in the Examples as to the precise formulation of such materials.

Examples 1–8

Useful TPO blends along with properties such as gasoline resistance melt flow rate and density, are shown in Table 2. In these examples, the surfaces of the articles to be painted are conventionally powerwashed and treated with a conventional chlorinated polyolefin adhesion promoter. A two component polyurethane coating is then applied and cured by baking at about 80° C.

TABLE 2

| Material Type | Form | Kind | C-1 | C-2 | C-3 | C-4 | Ex 1 | Ex 2 | C-5 | C-6 | Ex 3 | Ex 4 | Ex 5 | Ex 6 | Ex 7 | Ex 8 |
|---|---|---|---|---|---|---|---|---|---|---|---|---|---|---|---|---|
| 20 mfr PP | Flake | | 65 | 65 | 65 | 65 | 65 | 65 | 65 | 65 | 65 | 65 | 65 | 65 | 65 | 65 |
| EPDM I | Bale | | | 14 | 14 | 14 | 14 | 14 | 14 | 15.6 | 21.3 | 20.7 | 19.1 | 19.1 | | |

TABLE 2-continued

| | | | C-1 | C-2 | C-3 | C-4 | Ex 1 | Ex 2 | C-5 | C-6 | Ex 3 | Ex 4 | Ex 5 | Ex 6 | Ex 7 | Ex 8 |
|---|---|---|---|---|---|---|---|---|---|---|---|---|---|---|---|---|
| EO 1 | Pellets | | | | 21 | | | | | 14 | | | | | | 15.4 |
| EO 2 | Pellets | | 35 | 21 | | | | | | | | | | | | |
| T-56-DCPD | Liquid | EPDM | | | | | | | | 7 | | | | | | |
| 300-1 | Pellets | EOBM | | | | 21 | | | | | 19.4 | | | | | |
| CO1R02 | Pellets | EOBM | | | | | 21 | | | | | 13.7 | | | | |
| CO1R02A | Pellets | EOBM | | | | | | 21 | | | | | | | | |
| CO1R03 | Pellets | EOBM | | | | | | | | | | | 14.3 | | | |
| CO1R04 | Pellets | EOBM | | | | | | | | | | | | 15.9 | | |
| CO1R05 | Pellets | EOBM | | | | | | | | | | | | | 15.9 | |
| C18R3 | Pellets | EOBM | | | | | | | | | | | | | 35 | 19.6 |
| B225 | Pellets | AO | 0.3 | 0.3 | 0.3 | 0.3 | 0.3 | 0.3 | 0.3 | 0.3 | 0.3 | 0.3 | 0.3 | 0.3 | 0.3 | 0.3 |
| Property | Units | | | | | | | | | | | | | | | |
| E-10 w. WB130CDI/R784/R788 | min | | 10 | 26 | 10 | 20 | >120 | >120 | >120 | 21 | >120 | >120 | >120 | >120 | >60 | 41 |
| MFR, 230° C./2.16 Kg | dg/min. | | 9.4 | 9.4 | 10.2 | 16.2 | 13.9 | 13.3 | 13.7 | 14.5 | 14.1 | 14.2 | 12.1 | 13.9 | 17.1 | 15.3 |

Notes:

| | |
|---|---|
| 20 mfr PP | Polypropylene, Melt Flow Rate = 20 dg/min @ 230° C./2.61 Kg available from |
| EPDM I | 4% Ethylidene norbornene, C2/C3 = 58/42, Mooney = 35 ML(1 + 4) @ 100° C. available from |
| EO 1 | Ethylene-Octene Copolymer, 1.0 MI @ 190° C./2.61 Kg; Mw/Mn = 2.0, I10/I2 = 8.1 available from |
| EO 2 | Ethylene-Octene Copolymer, 0.5 MI @ 190° C./2.61 Kg; Mw/Mn = 2.1, I10/I2 = 7.3 available from |
| T-56-DCPD | EPDM 9.5% Dicyclopentadiene, C2/C3 = 48/52, Mv = 5,500 available from |
| 300-1 | ~36 wt % of 4K Mw 0.886 g/cc, ~64 wt % of 158K Mw 0.862 g/cc, Overall Mw = 102K, 0.868 g/cc; Mw/Mn = 23 |
| CO1R02 | ~51 wt % of 12.7K Mw 0.87 g/cc, ~49 wt % of 227K Mw 0.857 g/cc, Overall Mw = 118K, 0.863 g/cc; Mw/Mn = 11 |
| CO1R02A | ~56 wt % of 14.5K Mw 0.87 g/cc, ~44 wt % of 247K Mw 0.858 g/cc, Overall Mw = 116K, 0.864 g/cc; Mw/Mn = 11 |
| CO1R03 | ~50 wt % of 9K Mw 0.877 g/cc, ~50 wt % of 215K Mw 0.861 g/cc, Overall Mw = 111K, 0.867 g/cc; Mw/Mn = 14, I10/I2 = 17 |
| CO1R04 | ~44 wt % of 7.1K Mw, 0.877 g/cc, ~56 wt % of 217K Mw, 0.865 g/cc, Overall Mw = 125K, 0.871 g/cc; Mw/Mn = 21, I10/I2 = 12 |
| CO1R05 | ~44 wt % of 5.7K Mw, 0.874 g/cc, ~56 wt % of 214K Mw, 0.865 g/cc, Overall Mw = 122K, 0.87 g/cc; Mw/Mn = 21, I10/I2 = 14 |

As can be seen from the comparison of Controls 1–4 with Examples 1–2, the use of a bimodal elastomer according to the invention provides higher melt flow rates of the TPO blend, as well as significantly increased gasoline resistance of up to 5 times that of the comparative examples for painted molded articles of such blends.

Control 4 shows that the low molecular weight mode must have a density less than 0.88 g/cc to achieve good paint adhesion.

A comparison of Control 5 with Examples 1 through 6 illustrates that excellent paint adhesion can be obtained without having to use a liquid, low molecular weight EPDM.

Examples 3–6 illustrate the effect on melt viscosity by varying the relative amounts of high molecular weight EPDM and bimodal elastomer. These examples also show that the use of different molecular weight distributions in the bimodal elastomer within the ranges shown does not significantly affect the performance of the blend of its advantageous paint adherence properties.

Examples 9–10

These examples illustrate the comparative properties and performance of TPO blends containing a high/high bimodal elastomer with different conventional formulations containing poly(ethylene α-butene or co-octene) elastomers. The formulations and properties are shown in Table 3.

A comparison of Control 7 and Example 9 shows that the use of the bimodal elastomer provides much better weld line strength than the use of the poly(ethylene-octene) elastomer Example 10 compared to Controls 8–11 shows that the use of the bimodal elastomer provides much better weld line strengths and low temperature impact properties compared to blends containing poly-(ethylene-butene or -octene) elastomers. In addition, the gloss for the painted article of Example 10, which included the bimodal elastomer, was significantly improved over that of Control 8, which included a mixture of poly-(ethylene -butene and -octene) elastomers.

TABLE 3

| | C-7 | Ex 9 | C-8 | C-9 | C-10 | C-11 | Ex 10 |
|---|---|---|---|---|---|---|---|
| Material Type | | | | | | | |
| 20 MFR PP | 60 | 60 | | | | | |
| 35 MFR HIPP | | | 62 | 62 | 62 | 62 | 62 |
| EBR | | | 22 | | | | |
| EOR1 | | | 11 | | | | |
| EOR2 | 40 | | | | 33 | 23 | |
| EOR3 | | | | 33 | | 10 | |
| Bimodal EOR | | 40 | | | | | 33 |
| Filler | | | 5 | 5 | 5 | 5 | 5 |
| Property | | | | | | | |
| Izod @ RT (ft-lbs/in) | | | PB | NB | NB | NB | NB |
| Izod @ −10 C. {ft-lbs/in) | | | 1.26 | PB | 3.09 | PB | PB |

TABLE 3-continued

|  | C-7 | Ex 9 | C-8 | C-9 | C-10 | C-11 | Ex 10 |
|---|---|---|---|---|---|---|---|
| Izod @ −30 C. (9 ft-lbs/in) |  |  | 1.44 | 1.43 | 1.49 | 1.68 | 2.39 |
| WL Flex Peak Stress (psi) | 2854 | 3169 | 3567 | 3919 | 3413 | 3774 | 4253 |
| WL Flex En. to Break (in-lb) | 2.85 | 3.01 | 0.74 | 1.08 | 0.67 | 0.89 | 3.03 |
| WL Tensile Break Stress (psi) | 1930 | 2042 | 2349 | 2019 | 1855 | 2059 | 2567 |
| WL Tensile Break Elong. (%) | 8 | 11.1 | 3.2 | 2.7 | 2.4 | 2.8 | 4.3 |
| WL Tensile En. to Break (in-lb) | 15.4 | 22.9 | 6.3 | 4.4 | 3.6 | 4.7 | 10.2 |
| Gloss |  |  | 68.8 |  |  |  | 62.6 |

Notes:

| 20 MFR PP | Polypropylene, Melt Flow Rate = 20 dg/min @ 230° C./2.16 Kg available from Solvay as |
|---|---|
| 35 MFR HIPP | Polypropylene, Melt Flow Rate = 35 dg/min @ 230° C./2.16 Kg available from Solvay as |
| EBR | Poly(ethylene-co-butene); C2 = 80%, MFR @ 190° C., 2.16 Kg = 0.8 dg/min |
| EOR1 | Poly(ethylene-co-octene); C2 = 80%, MFR @ 190° C., 2.16 Kg = 5 dg/min |
| EOR2 | Poly(ethylene-co-octene); C2 = 80%, MFR @ 190° C., 2.16 Kg = 1 dg/min |
| EOR3 | Poly(ethylene-co-octene); C2 = 80%, MFR @ 190° C., 2.16 Kg = 0.5 dg/min |
| Bimodal EOR | Bimodal poly(ethylene-co-octent); high mode MW = 260,000; low mode MW = 114,000 |
| Izod Test | NB = no break; PB = partial break; WL = weld line |

Upon reviewing the data, it is seen that, in the first embodiment, the best results are obtained when a multimodal elastomer having high and low molecular weight components present, provides enhanced paint bonding to the molded polymer blend. In the second embodiment, better physical properties, in particular weldline strength and low temp impact strength, are attained compared to blends that do not contain multimodal elastomers.

Other aspects of the invention will be apparent to those skilled in the art from consideration of the specification, or from practice of the invention disclosed herein. For example, despite the preferred embodiment of the present invention which includes a bimodal elastomer, one of ordinary skill in the art would realize that multimodal elastomers with three, four, five or even more modes can be provided by making the elastomer in multiple, sequentially arranged reactors in accordance with the principles disclosed herein for two reactors. Such multimodal elastomers are considered as part of the present invention, since they would contain at least two modes as specifically disclosed herein. Thus, it is intended that the specification and examples be considered as exemplary only, with the scope and spirit of the invention being indicated by the following claims.

What is claimed is:

1. A thermoplastic polyolefin blend comprising:
   a polyolefin component of a substantially crystalline virgin polymer in an amount of about 30 to 98 percent by weight of the blend; and
   an elastomer of a sequentially polymerized ethylene-α-olefin copolymer having a multimodal distribution comprising first and second modes of at least one of: (A) molecular weight, with the first and second modes differing by at least about 25,000 in weight average molecular weight; (B) density, with the first and second modes differing by at least about 0.005 g/cc; or (C) α-olefin monomers, with the first and second modes including comonomers which differ in length by at least one carbon atom, wherein the elastomer is present in an amount of about 2 to 70 percent by weight of the blend; wherein the multimodal distribution has between 2 and 10 modes.

2. The blend of claim 1 wherein the polyolefin component is present in an amount of about 50 to 95 percent by weight of the blend, has a crystallinity of above 50% and is a polyethylene polymer, polypropylene polymer, or copolymer of ethylene and at least one of a $C_3$ to $C_{10}$ α-olefin.

3. The blend of claim 1 wherein the multimodal elastomer is substantially amorphous and is present in an amount of about 4 to 60 percent by weight.

4. The blend of claim 1 wherein one mode has a weight average molecular weight which is a multiple of from at least 1.5 to about 50 times that of the other mode.

5. The blend of claim 4 wherein the molecular weight of one mode is about 30,000 or less and the molecular weight of the other mode is at least about 150,000.

6. The blend of claim 5 wherein the lower molecular weight mode has a density of less than about 0.88 g/cc.

7. The blend of claim 1 wherein the molecular weight of one mode is at least about 75,000 and the molecular weight of the other mode is at least about 115,000.

8. The blend of claim 1 wherein the molecular weight of one mode is about 100,000 and the molecular weight of the other mode is at least about 200,000.

9. The blend of claim 1 wherein the multimodal elastomer has one mode of density of at least 0.85 g/cc and the other mode of density of less than about 0.96 g/cc, with the difference between the highest and lowest mode densities being less than about 0.1 g/cc.

10. The blend of claim 1 wherein the multimodal elastomer has at least two modes where the comonomers differ in length by at least two carbon atoms, and one of which is propene, butene, hexene or octene.

11. The blend of claim 1 further comprising at least one additional polymeric component in an amount of between about 1 and 20 percent by weight of the blend.

12. The blend of claim 1 wherein at least two different additional polymeric components are present but in a total amount of about 3 and 35 percent by weight of the blend.

13. The blend of claim 12 wherein one additional polymeric component is a copolymer of ethylene and a $C_3$ to $C_{10}$ α-olefin or a terpolymer of ethylene and a $C_3$ to $C_{10}$ α-olefin and a diene monomer, and another additional polymeric component is a copolymer of ethylene and an α-olefin which is made with a Kaminsky or metallocene catalyst.

14. The blend of claim 1 further comprising a filler in the amount of about 1 to 30 percent by weight of the blend.

15. The blend of claim 14 wherein the filler is talc, mica, glass, or calcium carbonate.

16. The blend of claim 1 in the form of a molded article having an outer surface, an overall molecular weight of between 70,000 and 300,000, and an overall density of between 0.85 and 0.95 g/cc.

17. The blend of claim 14 in the form of a molded article having an outer surface, an overall molecular weight of between 70,000 and 300,000, and an overall density of between 0.85 and 1.25 g/cc.

18. The blend of claim 16 wherein at least a portion of the outer surface of the article includes a coating thereon.

19. The blend of claim 17 wherein at least a portion of the outer surface of the article includes a coating thereon.

20. The blend of claim 18 wherein the coating comprises a two component polyurethane material.

21. The blend of claim 19 wherein the coating comprises a two component polyurethane material.

22. The blend of claim 1 wherein the multimodal elastomer has a Mw/Mn ratio of greater than 6 with a melt flow index @ 10 Kg and 2Kg at 190° C. (I10/I2) that is greater than 10.

23. The blend of claim 1 wherein the multimodal elastomer has a Mw/Mn ratio of about 2 or greater with a melt flow index @ 10 Kg and 2Kg at 190° C. (I10/I2) that is about 7.3 or greater.

* * * * *